US011416508B2

(12) United States Patent
Halioui et al.

(10) Patent No.: US 11,416,508 B2
(45) Date of Patent: Aug. 16, 2022

(54) CONTROLLING GENERATION OF MULTI-INPUT SEARCH RESULTS

(71) Applicant: Amadeus S.A.S., Biot (FR)

(72) Inventors: Karim Halioui, Waltham, MA (US); Antoine Menard, Mougin (FR)

(73) Assignee: Amadeus S.A.S., Biot (FR)

(*) Notice: Subject to any disclaimer, the term of this patent is extended or adjusted under 35 U.S.C. 154(b) by 0 days.

(21) Appl. No.: 17/047,233

(22) PCT Filed: Apr. 18, 2019

(86) PCT No.: PCT/EP2019/060169
§ 371 (c)(1),
(2) Date: Oct. 13, 2020

(87) PCT Pub. No.: WO2019/202112
PCT Pub. Date: Oct. 24, 2019

(65) Prior Publication Data
US 2021/0034612 A1 Feb. 4, 2021

(30) Foreign Application Priority Data
Apr. 19, 2018 (FR) .................................... 1853428

(51) Int. Cl.
*G06F 16/248* (2019.01)
*G06F 16/2455* (2019.01)

(52) U.S. Cl.
CPC ........ *G06F 16/248* (2019.01); *G06F 16/2455* (2019.01)

(58) Field of Classification Search
CPC .......................... G06F 16/248; G06F 16/2455
(Continued)

(56) References Cited

U.S. PATENT DOCUMENTS 7,343,551 B1   3/2008 Bourdev
7,711,587 B2   5/2010 De Marcken
(Continued)

FOREIGN PATENT DOCUMENTS

WO   2012024585 A1   2/2012

OTHER PUBLICATIONS

Ramachandra et al., "Holistic optimization by prefetching query results" Proceedings of the 2012 ACM SIGMOD International Conference on Management of Data May 2012 pp. 133-144.
(Continued)

*Primary Examiner* — Dung K Chau
(74) *Attorney, Agent, or Firm* — Thompson Hine LLP

(57) ABSTRACT

A method of controlling generation of search results based on a plurality of search inputs includes, at a server: receiving an interim query containing a subset of interim search inputs; generating, based on the subset of interim search inputs: a subset of predicted search inputs; and a confidence level associated with the subset of predicted search inputs; when the confidence level exceeds a threshold, initiating a search operation to generate predicted search results based on a set of initial inputs including (i) the subset of interim search inputs and (ii) the subset of predicted search inputs; when the confidence level does not exceed the threshold, awaiting an additional query without initiating the search operation; and transmitting a search response based on at least one of the interim query and the additional query.

19 Claims, 10 Drawing Sheets

(58) Field of Classification Search
USPC .......................................................... 707/722
See application file for complete search history.

(56) References Cited

U.S. PATENT DOCUMENTS

| | | | |
|---|---|---|---|
| 8,626,763 | B1 | 1/2014 | Wolfe |
| 8,781,864 | B2 | 7/2014 | De Marcken |
| 9,104,664 | B1 | 8/2015 | Jain |
| 9,251,478 | B2 | 2/2016 | Francois et al. |
| 2005/0108069 | A1 | 5/2005 | Shiran et al. |
| 2010/0305983 | A1 | 12/2010 | De Marcken |
| 2011/0047120 | A1 | 2/2011 | Kamvar et al. |
| 2011/0055202 | A1 | 3/2011 | Heimendinger |
| 2011/0258183 | A1 | 10/2011 | Gibbs et al. |
| 2014/0181085 | A1* | 6/2014 | Gokhale ............... G06F 16/168 707/722 |
| 2014/0344344 | A1 | 11/2014 | Beckman et al. |
| 2016/0063118 | A1* | 3/2016 | Campbell ........... G06F 16/9535 707/722 |
| 2016/0110660 | A1 | 4/2016 | Daughtrey et al. |
| 2016/0335261 | A1* | 11/2016 | Salvetti ............... G06F 16/2455 |
| 2016/0360382 | A1* | 12/2016 | Gross ..................... G06F 9/445 |
| 2018/0129892 | A1* | 5/2018 | Bahl .................. G06K 9/00771 |

OTHER PUBLICATIONS

I. T. Bowman and K. Salem, "Semantic Prefetching of Correlated Query Sequences," 2007 IEEE 23rd International Conference on Data Engineering, Istanbul, 2007, pp. 1284-1288, doi: 10.1109/ICDE.2007.368994.
International Searching Authority, International Search Report and Written Opinion dated Jun. 6, 2019 in PCT/EP2019/060169.

* cited by examiner

CONTROLLING GENERATION OF MULTI-INPUT SEARCH RESULTS

FIELD

The specification relates generally to the generation of search results, and specifically to systems and methods for controlling generation of multi-input search results.

BACKGROUND

Various types of data searches, such as travel-related searches, involve search queries containing a number of variable inputs, which must be matched to a large, variable set of possible search results. Executing searches under such conditions is computationally expensive and completion of a search may therefore require a non-trivial length of time. When searches are executed upon receipt of the inputs, the period of time taken to produce results may exceed several seconds, during which the requesting client device is idle. Further, the above-mentioned period of time may lead to reduced customer retention.

Some attempts to solve the above problems have relied on precomputed and cached search results for a number of queries. Incoming queries are compared to the precomputed queries and when a match is found, the cached results are returned. Although this approach can provide improved response times, the cached precomputed results may become outdated, and as a result inaccurate search results may be produced.

SUMMARY

An aspect provides a method of controlling generation of search results based on a plurality of search inputs including, at a server: receiving an interim query containing a subset of interim search inputs; generating, based on the subset of interim search inputs: a subset of predicted search inputs; and a confidence level associated with the subset of predicted search inputs; when the confidence level exceeds a threshold, initiating a search operation to generate predicted search results based on a set of initial inputs including (i) the subset of interim search inputs and (ii) the subset of predicted search inputs; when the confidence level does not exceed the threshold, awaiting an additional query without initiating the search operation; and transmitting a search response based on at least one of the interim query and the additional query.

According to a further aspect, transmitting the search response comprises, responsive to generation of the predicted search results, transmitting the predicted search results to the client device for display at the client device following receipt of a set of final inputs matching the initial set of inputs at a client device.

According to a further aspect, transmitting the search response comprises, responsive to generation of the predicted search results, storing the predicted search results pending receipt of a final query.

A further aspect comprises receiving a final query containing a set of final inputs; in response to determining that the set of final inputs matches the set of initial inputs, transmitting the predicted search results; and in response to determining that the set of final inputs does not match the set of initial inputs, initiating a further search operation to generate final search results based on the set of final inputs, and transmitting the final search results.

A further aspect comprises receiving a final query containing a set of final inputs that do not match the set of initial inputs; and initiating a further search operation to generate final search results based on the set of final inputs; wherein transmitting the search response further comprises transmitting the final search results to the client device.

According to a further aspect, the final query further contains a search command indicating a selection of a search element at the client device.

A further aspect comprises receiving the additional query; and when the additional query is a further interim query containing a subset of further interim search inputs, repeating the generation of predicted search inputs and a confidence level associated with the predicted search inputs; and when the additional query is a final query containing a set of final inputs, initiating a further search operation to generate final search results based on the set of final inputs, and transmitting the final search results.

According to a further aspect, the subset of interim inputs corresponds to a first subset of predefined input fields presented at the client device; and the subset of predicted inputs corresponds to a remaining subset of the predefined input fields.

According to a further aspect, the method further comprises, responsive to receiving the interim query, prior to generating the subset of predicted search inputs, retrieving a media element and transmitting the media element to the client device for storage at the client device pending receipt of the search results.

A further aspect comprises, prior to retrieving and transmitting the media element, generating a preliminary confidence level indicating a likelihood that the client device will generate a final query; and performing the retrieving and transmitting only when the preliminary confidence level exceeds a preliminary threshold.

According to a further aspect, generating the subset of predicted inputs and the confidence level includes retrieving a historical record of received queries and corresponding responses, and comparing the historical record to the subset of interim inputs.

According to another aspect, a server arranged to control a generation of search results based on a plurality of search inputs is provided. The server comprises a memory; a communications interface; and a processor interconnected with the memory and the communications interface, and configured to perform any one of the aforementioned methods.

According to another aspect, a computer program product is provided comprising program code instructions stored on a computer readable medium to implement the method steps according to aforementioned methods when said program is executed on a computer.

According to another aspect, a method at a client device of controlling the provision of search results based on a plurality of search inputs is provided. The client device method comprises, at the client device, receiving a subset of interim search inputs; generating and sending an interim query containing the subset of interim search inputs; in response to sending the interim query, receiving and storing: a set of initial inputs including (i) the subset of interim search inputs and (ii) a subset of predicted search inputs; and predicted search results corresponding to the set of initial inputs; receiving a set of final inputs; and presenting a search response on a display of the client device, according to whether the set of final inputs matches the set of initial inputs.

According to a further aspect, presenting the search response comprises retrieving the set of initial inputs from storage; comparing the set of initial inputs to the set of final inputs; responsive to determining that the set of final inputs matches the set of initial inputs, retrieving the predicted search results and presenting the predicted search results on the display.

A further aspect comprises, responsive to determining that the set of final inputs does not match the set of initial inputs, sending a final query containing the final inputs, and receiving and presenting on the display, in response to the final query, final search results.

A further aspect comprises, responsive to determining that the set of final inputs does not match the set of initial inputs, discarding the predicted search inputs.

According to a further aspect, generating and sending the interim query comprises monitoring a plurality of input fields; and generating and sending the interim query when at least one of the input fields has been completed.

According to another aspect a client device arranged to control a generation of search results based on a plurality of search inputs is provided. The client device comprises a memory; a communications interface; and a processor interconnected with the memory and the communications interface, and configured to perform any one of the aforementioned client device methods.

According to another aspect, a computer program product is provided comprising program code instructions stored on a computer readable medium to implement the method steps according to aforementioned client device methods when said program is executed on a computer.

According to yet another aspect, a system arranged to control a generation of search results based on a plurality of search inputs is provided. The system comprises a server and a client device coupled to the server via a network. The server may comprise a memory, a communications interface, and a processor interconnected with the memory and the communications interface, and configured to perform any one of the aforementioned server methods. The client device may comprises a memory, a communications interface, and a processor interconnected with the memory and the communications interface, and configured to perform any one of the aforementioned client device methods.

According to yet another aspect, a computer program product is provided comprising program code instructions stored on one or more computer readable media to implement the method steps according to aforementioned server and client device methods when said program is executed on one or more computers.

BRIEF DESCRIPTIONS OF THE DRAWINGS

Embodiments are described with reference to the following figures, in which.

DETAILED DESCRIPTION

Figure 1:
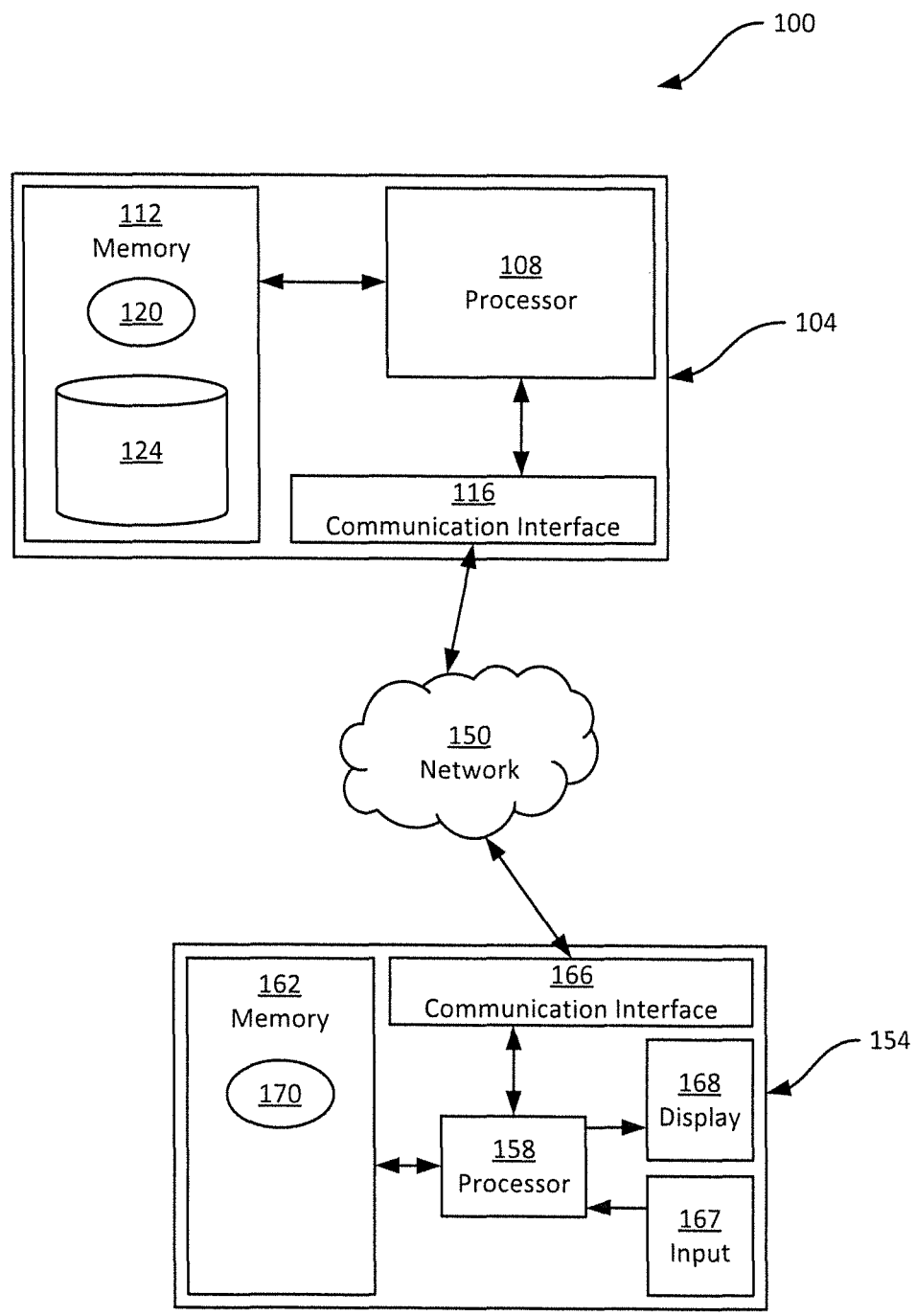
FIG. 1 depicts a system for controlling the generation of multi-input search results.

FIG. 1 depicts a system 100 for controlling the generation of multi-input search results. The system 100 includes a server 104 configured to receive requests for search results, for example over a network 150 from at least one client computing device 154 (also referred to herein as the client device 154 or simply as the device 154). Responsive to such requests, the server 104 is configured to generate search results and provide the search results to the client device 154 via the network 150.

The search results, in the present example, are travel-related search results. In particular, the examples discussed below illustrate the search results as flights. That is, each search result corresponds to specific flights from a given origin airport to a given destination airport, on a specific date and having a specific price. Various other types of search results are also contemplated, including other travel-related search results (e.g. ground-based travel such as train and bus trips, hotel bookings, vehicle rentals, and the like) as well as search results unrelated to travel.

As will be apparent to those skilled in the art, the generation of search results such as those mentioned above at the server 104 typically requires the matching of multiple inputs provided by the client device 154 to a significant number of potential results, which may themselves be subject to frequent changes. The generation of such search results may therefore be sufficiently complex to consume a non-trivial period of time to complete at the server 104. Thus, a non-trivial period of time may elapse between the submission of a search request by the client device 154 and the receipt and presentation of search results at the client device 154.

A non-trivial period of time, in the context of the present disclosure, indicates a period of time that is readily perceived by a human operator of the client device 154. For example, a non-trivial period of time may be any period of time that is greater than about one second. Flight searches may require between about two and about twenty seconds to complete, for example. It will be understood that the above time periods are provided simply for the purpose of illustration; the functionality of the system 100 may be also deployed for the generation of search results requiring smaller or greater periods of time than the examples noted above.

As will be discussed in greater detail below, the server 104 and the client device 154 are configured to interact to enable the initiation of search computation at the server 104 pre-emptively under certain conditions. Pre-emptive initiation of search computation at the server 104 may in turn reduce the length of time that elapses between submission of a search request at the client device 154, and receipt and presentation of search results, while minimizing negative effects on the accuracy of the search results.

Before discussing the functionality of the system 100 in greater detail, certain components of the server 104 and the client device 154 will be described. The server 104 includes at least one processor 108, such as a central processing unit (CPU) or the like. The processor 108 is interconnected with a memory 112, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 108 and the memory 112 are generally comprised of one or more integrated circuits (ICs).

The processor 108 is also interconnected with a communication interface 116, which enables the server 104 to communicate with other computing devices (e.g. the client device 154) via the network 150. The communications interface 116 therefore includes any necessary components (e.g. network interface controllers (NICs), radio units, and the like) to communicate via the network 150. The specific components of the communications interface 116 are selected based on upon the nature of the network 150, which includes any suitable combination of wired and/or wireless local networks, and wired and/or wireless wide-area networks. The server 104 can also include input and output devices connected to the processor 108, such as keyboards, mice, displays, and the like (not shown).

The components of the server 104 mentioned above can be deployed in a single enclosure, or in a distributed format. In some examples, the server 104 includes a plurality of processors, either sharing the memory 112 and communications interface 116, or each having distinct associated memories and communications interfaces.

The memory 112 stores a plurality of computer-readable programming instructions, executable by the processor 108, in the form of various applications, including a search application 120. As will be understood by those skilled in the art, the processor 108 executes the instructions of the application 120 (and any other suitable applications) in order to perform various actions defined by the instructions contained therein. In the description below, the processor 108, and more generally the server 104, are said to be configured to perform those actions. It will be understood that they are so configured via the execution (by the processor 108) of the instructions of the applications stored in memory 112. Execution of the search application 120, as will be discussed below, configures the server 104 to receive search requests from the client device 154, generate search results based on the requests, and return the search results to the client device 154.

The memory 112 also stores a database 124 of primary data from which the above-mentioned search results are generated. The database 124, in the present example, therefore contains attributes defining a plurality of flights (e.g. origin and destination locations, dates, airline identifiers, fares, available seats and the like). As will be apparent to those skilled in the art, the server 104 may also be configured to periodically update the database to reflect changes to scheduling data, availability, price and the like. The specific format of the records in the database 124, as well as the management of those records, are not discussed in detail in the present disclosure.

The client device 154 is implemented as any of a variety of computing devices, including a desktop computer, a laptop computer, a smart phone, a tablet computer and the like. The client device 154 can also be implemented, in some examples, as a kiosk, for example deployed in an airport and operated by an airline.

The client device 154 includes at least one processor 158, such as a central processing unit (CPU) or the like. The processor 158 is interconnected with a memory 162, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 158 and the memory 162 are generally comprised of one or more integrated circuits (ICs).

The processor 158 is also interconnected with a communications interface 166, which enables the client device 154 to communicate with other computing devices (e.g. the server 104) via the network 150. The communications interface 166 therefore includes any necessary components (e.g. network interface controllers (NICs), radio units, and the like) to communicate via the network 150. The specific components of the communications interface 166 are selected based on upon the nature of the network 150, which includes any suitable combination of wired and/or wireless local networks, and wired and/or wireless wide-area networks.

The client device 154 also includes at least one input assembly 167 configured to receive input (e.g. from an operator of the client device 154) and provide the input to the processor 158. The input assembly 167 includes any one of, or any suitable combination of, a keyboard, a mouse, a touch screen, a microphone and the like. The client device 154 further includes a display 168 interconnected with the processor 158 and controllable by the processor to present various information (including, as will be discussed below, input fields selectable via the input assembly 167, as well as search results received from the server 104) to an operator of the client device 154. The client device 154 also includes, in some examples, additional output assemblies beyond the display 168, such as a speaker (not shown).

The memory 162 stores a plurality of computer-readable programming instructions, executable by the processor 158, in the form of various applications, including a client search application 170. As will be understood by those skilled in the art, the processor 158 executes the instructions of the application 170 (and any other suitable applications) in order to perform various actions defined by the instructions contained therein. In the description below, the processor 158, and more generally the client device 154, are said to be configured to perform those actions. It will be understood that they are so configured via the execution (by the processor 158) of the instructions of the applications stored in memory 162. Execution of the application 170, as will be discussed below, configures the client device 154 to receive inputs and transmit requests to the server 104, as well as to receive search results from the server 104 and present the search results via the display 168. The application 170, in some examples, is a dedicated application that configures the client device 154 to interact with the server 104 for the specific purpose of obtaining search results. In other examples, the application 170 is a web-browser that enables the client device 154 both to interact with the server 104 and to interact with various other computing devices (not shown).

Figure 2:
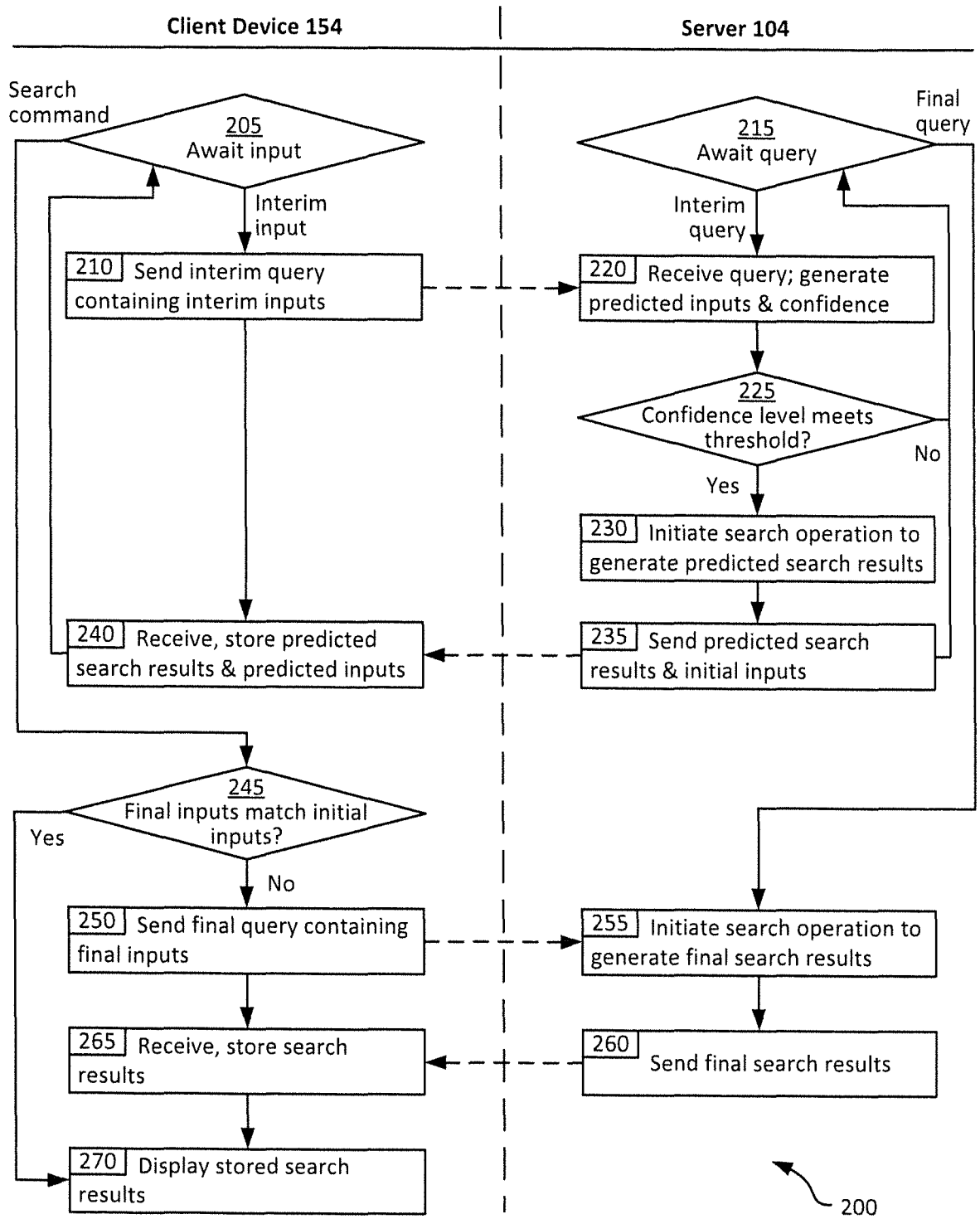
FIG. 2 depicts a method for controlling the generation of multi-input search results.

Turning now to FIG. 2, the operation of the system 100 will be described in greater detail. Specifically, FIG. 2 illustrates a method 200 of controlling the generation of search results. The method 200 will be described in conjunction with its performance within the system 100. Thus, in the discussion below certain blocks of the method 200 are performed by the client device 154 via the execution of the application 170 by the processor 158, while other blocks of the method 200 are performed by the server 104 via execution of the application 120 by the processor 108.

Figure 3A:
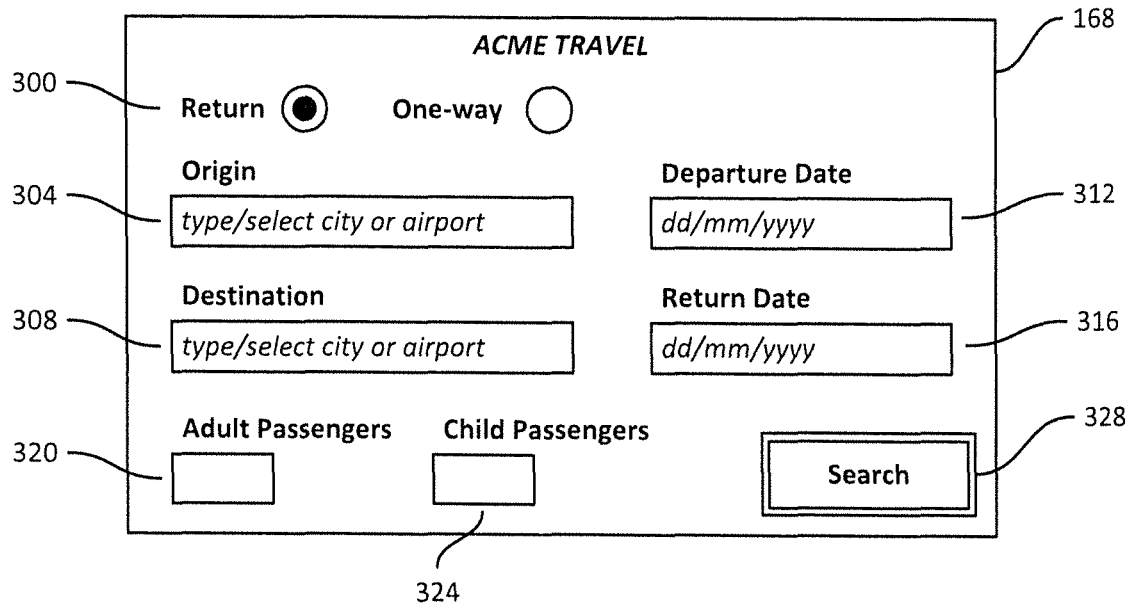
FIG. 3A depicts a search input interface employed in the method of FIG. 2.

At block 205, the client device 154 is configured to await input, e.g. from the input assembly 167. Prior to block 205, the client device 154 is presumed to have retrieved (e.g. from data stored in association with the application 170 or by requesting a web page from the server 104) and presented on the display 168 a plurality of prompts for search inputs. Referring to FIG. 3A, an example search interface as generated on the display 168 prior to the performance of block 205 is illustrated.

The search interface shown in FIG. 3A includes a plurality of selectable (via the input assembly 167) input prompts each corresponding to a search input to be provided to the server 104. In the example shown, the interface includes prompts corresponding to a set of seven search inputs. The prompts are generally referred to as "fields" in the discussion below, although it will be understood that a wide variety of formats (e.g. text fields, drop-down menus and the like) may be employed to collect search inputs. In particular, a first search field 300 includes a pair of radio buttons selectable (typically in mutually exclusive fashion, such that only one of the buttons may be marked as selected at a time) to indicate whether a return flight or a one-way flight is to be requested. Second and third search fields 304 and 308 are fields into which an origin location and a destination location, respectively, are provided. Fourth and fifth fields 312 and 316 are fields into which departure and return (if applicable, based on the selection associated with the field 300) dates, respectively, are provided. Sixth and seventh fields 320 and 324 are fields into which a number of adult passengers and a number of child passengers, respectively, are provided. As will be apparent to those skilled in the art, various other search fields can also be provided. For example, the search interface can include further fields for any one or more of an indication of whether to restrict the search to non-stop (i.e. direct) flights only, a class preference, an airline preference, and the like. The interface also includes a selectable search element 328 for submitting a search query to the server 104 containing the inputs provided in the fields 300-324.

Returning to FIG. 2, in the present example the client device 154 is therefore configured to await receipt of an input associated with the interface shown in FIG. 3. The client device 154 is configured to take different actions depending on whether the input received at block 205 is an interim input or a search command. A search command is a selection of the search element 328. In other words, a search command is an explicit instruction received at the input assembly 167 to transmit a search query to the server 104.

An interim input, on the other hand, is the receipt of data in any one of the fields 300-324. For example, the client device 154 can be configured to detect an interim input by receiving input data corresponding to a particular field, followed by the selection (e.g. placement of focus on) of a different field. Thus, receipt of an origin location in the field 304, followed by a shifting of focus to the destination location field 308 (e.g. via activation of a "tab" key on a keyboard, selection of the field 308 with a mouse or touch screen), is detected as an interim input. Various other mechanisms for detecting interim inputs will also be apparent to those skilled in the art.

Figure 3B:
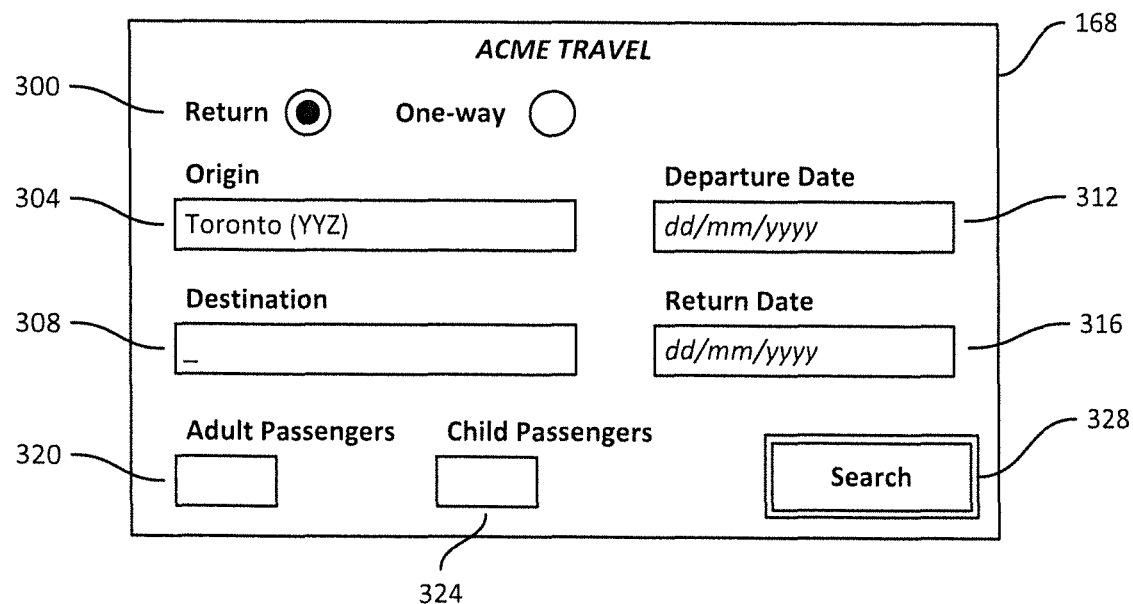
FIG. 3B depicts the search input interface of FIG. 3A, partially completed.

Returning to FIG. 2, the processing of interim inputs will be discussed first. Following receipt of an interim input, the client device 154 is configured to proceed to block 210. FIG. 3B illustrates the receipt of an example interim input, in the form of an origin location provided in the field 304, followed by a movement of focus to the field 308, indicating completion of the search input in the field 304. At block 210, the client device 154 is configured to transmit an interim query containing a subset of interim search inputs to the server 104, via the network 150. The interim query contains not only the search input most recently received at block 205, but also any other inputs received in connection with the fields 300-324.

Figure 4:
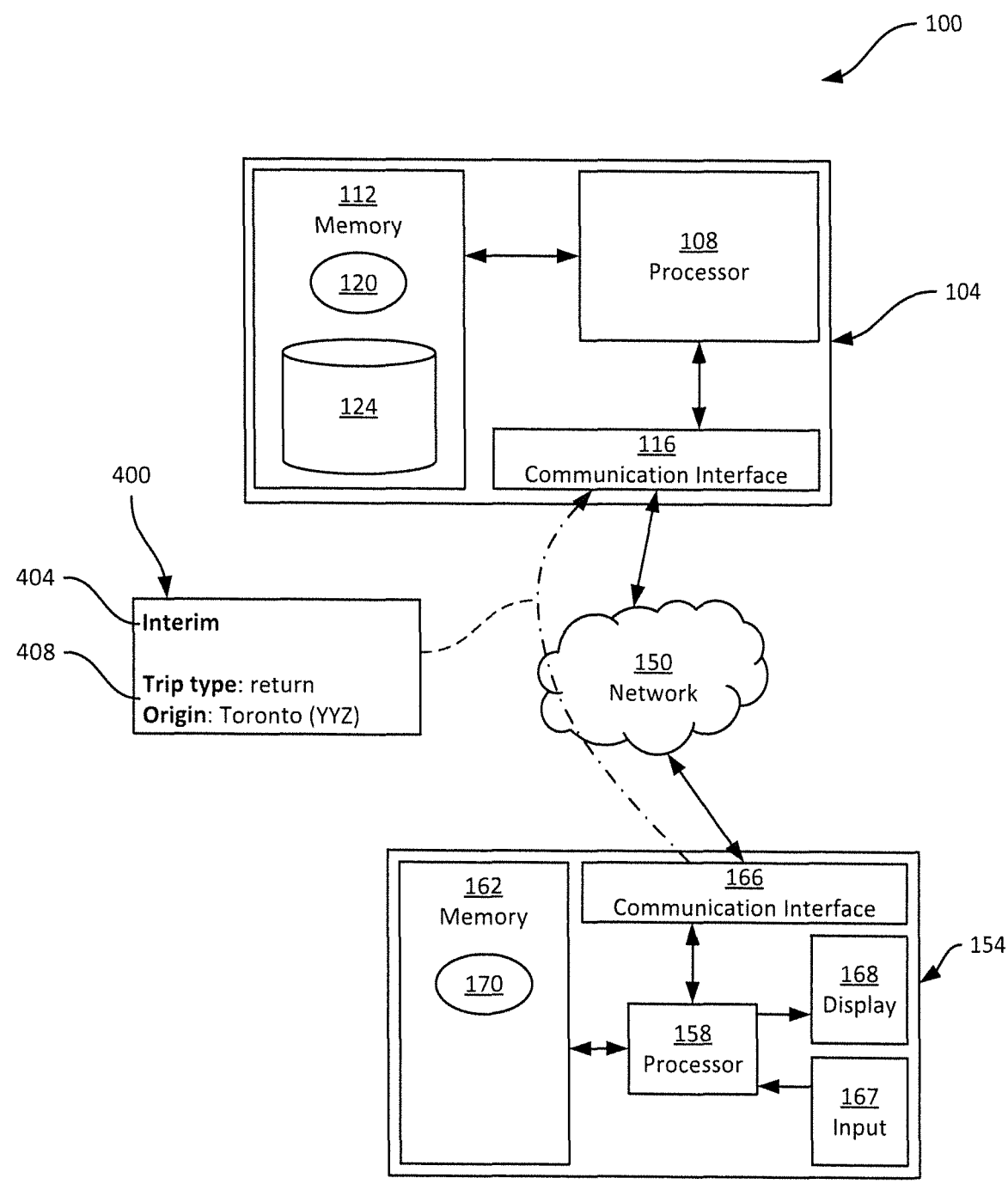
FIG. 4 depicts the transmission of an interim query during the performance of the method of FIG. 2.

Turning to FIG. 4, an example interim query 400 is illustrated being transmitted from the client device 154 to the server 104 via the network 150. The interim query 400 includes a subset of interim search inputs 408, including both the origin location discussed above, and the "return" trip type shown as selected in the field 300 in FIGS. 3A and 3B. The interim query 400 can also include a flag or other indicator 404 distinguishing the interim query from a final search query resulting from selection of the search element 328. In the present example, the query 400 simply includes the term "interim" as an indicator. In other examples though, various other means of distinguishing interim and final queries can be employed. For example, final queries may include an indicator, while interim queries may omit the indicator.

In the present example, the interim query 400 is sent automatically by the client device at block 210. That is, no further input is required to initiate transmission of the interim query 400, beyond the receipt of an interim input at block 205. The client device 154 further need not present any indication (e.g. via the display 168 or other output assemblies) that the interim query 400 has been transmitted. That is, the interim query 400 can be sent in a manner invisible to an operator of the client device 154.

Prior to the above-mentioned transmission of the interim query, the server 104 is configured to await the receipt of a query at block 215. The server 104, as will be apparent in the discussion below, is configured to process interim queries such as the query 400 differently from final search queries arising from the selection of the search element 328 at the client device 154. Thus, responsive to receipt of the interim query 400 at block 215, the server 104 proceeds to block 220.

At block 220, the server 104 is configured to receive the interim query 400 and to generate a subset of predicted search inputs based on the interim inputs 408 contained in the interim query 400. As will be apparent from the interim query 400 shown in FIG. 4, the subset of interim inputs received from the client device 154 may be incomplete. That is, the interim inputs may not include values for each of a set of inputs required by the server 104 to initiate a search. For example, the set of inputs required to initiate a search at the server 104 may include search inputs corresponding to at least the fields 300, 304, 308, 312 and 316 as shown in FIG. 3. The subset of predicted inputs generated at block 220 includes predicted inputs corresponding to those of the required set of search inputs for which the interim query does not include values. That is, the interim query may include a subset of the required inputs, and the predicted inputs represent a remainder of the required inputs. The predicted inputs may also include additional inputs (e.g.

values corresponding to the passenger type code fields 320 and 324) that may not be mandatory for the initiation of a search.

Various mechanisms are contemplated for the generation of the predicted search inputs. In general, the predicted search results are generated by the server 104 based not only on the interim search inputs, but also on historical records of final search queries. Such records may be stored in the database 124 or another suitable repository in the memory 112.

In some examples, the server 104 is configured to generate the predicted inputs by comparing the interim inputs, either individually or in sets, to the historical records to identify those of the historical records containing search inputs that match the interim inputs. Thus, in the present example, in which the interim inputs include the trip type "return" and the origin location "Toronto (YYZ)", the server 104 can be configured to identify all historical records having the same trip type and origin location. For each of the remaining fields not accounted for by the interim inputs (again, either individually or as a set), the server 104 is then configured to identify the most commonly occurring value or plurality of values in the identified historical records.

For example, the historical records may contain a plurality of records having the same trip type and origin location as shown in FIG. 4. The server 104 can be configured to rank that plurality of historical records according to the most common destination location. The ranking may reveal, for example, that a first portion (e.g. 75%) of the records have a given destination (e.g. Boston (BUS)), a further portion (e.g. 10%) of the records have another destination (e.g. Montreal (YUL)), and so on. The server 104 can be configured to repeat the same process for each of the other inputs to be predicted.

As will be apparent, for certain predicted inputs such as the departure and return dates (i.e. inputs corresponding to the fields 312 and 316), the server 104 is configured to select not the dates appearing in the historical records, but dates (departure and/or return dates) based on those in the historical records. For example, a first portion of the historical records (e.g. 60%) having trip types and origin locations matching those in the query 400 may have departure dates twenty days in the future from the receipt of the historical search query at the server 104. Thus, the server 104 can be configured to select, as a predicted departure date corresponding to the query 400, a date twenty days in the future from the date of receipt of the query 400.

The server 104 is configured, in some examples, to implement more complex mechanisms for generating the predicted search inputs at block 220. For example, the server 104 can store a previously configured (i.e. trained on a sample of the above-mentioned historical records) predictive model for generating the predicted search inputs. The generation at block 220 is performed, in such examples, by processing the interim inputs received in the interim query via the above-mentioned model. Any of a variety of machine learning models may be employed, including for example a random forest model. The generation of predicted search inputs may be employed by executing a plurality of such models each configured to generate a particular predicted search input (e.g. return date), each employing different subsets of the interim inputs to generate the corresponding predicted search input.

The generation of predicted search inputs at block 220 can also be based on additional data beyond the interim inputs themselves. Such additional data can include data derived from the interim inputs. For example, the additional data can include the continent on which the origin location is located, a day of the week on which the query 400 was received, a day of the week of an interim departure date, or the like. Other examples of additional data derived from the interim query 400 include the time of day at which the query 400 was received, The generation of predicted search inputs at block 220 can also be based on further data not directly derived from the interim inputs. For example, the client device 154 may be configured to transmit to the server 104, along with or as a part of the interim query 400, a cookie or other data stored in the memory 162 containing inputs stored from previous searches requested by the client device 154. For example, the client device 154 can be configured to store any input entered in the fields 320 and 324, for future reporting to the server 104 (albeit not as an interim input). Further examples of data not directly derived from the interim inputs in the query 400 but employed in the generation at block 220 include an operator location, for example based on a network address of the client device 154, or on an operator mailing address stored at the client device 154 and provided to the server 104 with the query 400.

Table 1, below, illustrates the result of the performance of block 220. In particular, Table 1 lists both the interim inputs received in the query 400, and the predicted inputs generated on the basis of the interim inputs. It will be understood that the server 104 need not store the interim and predicted inputs in the format shown below.

TABLE 1

Interim and Predicted Inputs

| | Input Field | Value |
|---|---|---|
| Interim Inputs | Trip type | Return |
| | Origin Location | Toronto (YYZ) |
| Predicted Inputs | Destination Location | Boston (BOS) |
| | Departure Date | May 6, 2018 |
| | Return Date | May 8, 2018 |
| | Adult Passengers | 1 |
| | Child Passengers | 0 |

The set of search inputs containing both the interim inputs and the predicted inputs is referred to herein as an initial set of search inputs.

At block 220, the server 104 is also configured to generate a confidence level corresponding to the predicted search inputs. The confidence level, in general, provides an assessment of the accuracy of the predicted search inputs. Taking the example above in which predicted search inputs are generated by selecting the inputs from historical records matching the interim inputs, the confidence level associated with the destination location of Boston (BOS) is 75%. The server 104 is configured to generate an aggregated confidence level for the entire subset of the predicted search inputs, for example based on individual confidence levels for each predicted search input. The aggregated confidence level may be, for example, an average of each individual confidence level. When the predicted search results are generated using a random forest model, for instance, the confidence level for each predicted input may be the fraction of classification trees that voted for the selected predicted input. The confidence level generated at block 220 may therefore be an aggregate of the above-mentioned fractions.

The server 104 is then configured, at block 225, to determine whether the confidence level generated at block 220 for the subset of predicted search inputs exceeds a previously configured threshold (e.g. stored as a setting in the application 120). As will be discussed below, one or more subsets of predicted search inputs that exceed the confidence level threshold are employed in the generation of search results. Because the generation of search results consumes a portion of the finite computational resources of the server 104, the threshold is set to restrict the commitment of computational resources to only those sets of predicted inputs that are sufficiently likely to be accurate. For example, the threshold may be set at 50% (or any equivalent expression of the same fraction). As will be apparent, a wide variety of other thresholds may be employed, based on any one or more of the computational resources available to the server 104, the volume of queries handled by the server, the complexity of the search process itself, and the like.

When the determination at block 225 is negative, the predicted search inputs are discarded, and the server 104 returns to block 215 to await a further query, without initiating a search operation. As will now be apparent, the next query may be another interim query with additional inputs that permit the generation of a more accurate set of predicted inputs at block 220 (i.e. having a greater confidence level).

When the determination at block 225 is affirmative, the server 104 proceeds to block 230. At block 230, the server 104 is configured to initiate a search operation to generate predicted search results based on the above-mentioned initial inputs (that is, the combination of the interim search inputs and the predicted search inputs). The search operation itself is implemented according to any suitable search mechanism, a variety of which will occur to those skilled in the art. In general, the server 104 is configured to select one or more records from the database 124 that satisfy the criteria set by the initial inputs. The selected records are the predicted search results (referred to as predicted as a result of the operation leading to their selection being based in part on predicted search inputs).

In some performances of the method 200, the generation of predicted search inputs at block 220 may lead to a plurality of subsets of predicted search inputs, more than one of which may meet the threshold evaluated at block 225. In such examples, the server 104 is configured to initiate a distinct search operation at block 230 for each of the subsets of predicted search inputs. Thus, at block 230 the server 104 generates a plurality of sets of predicted search results, each corresponding to a different set of initial inputs.

When a plurality of subsets of predicted search inputs are generated at block 220 and satisfy the threshold at block 225, the server 104 is configured, in some examples, to select only a portion of the subsets of predicted search inputs for which to initiate execution of a search operation at block 230. For example, if four subsets of predicted search inputs generated at block 220 meet the threshold at block 225, the server 104 can be configured to select only the three subsets of predicted search inputs with the highest confidence levels for use in block 230. In other words, the server 104 can initiate a number of search operations at block 230 equal to the number of subsets of predicted search inputs passing the assessment at block 225, up to a configurable maximum number.

Figure 5:
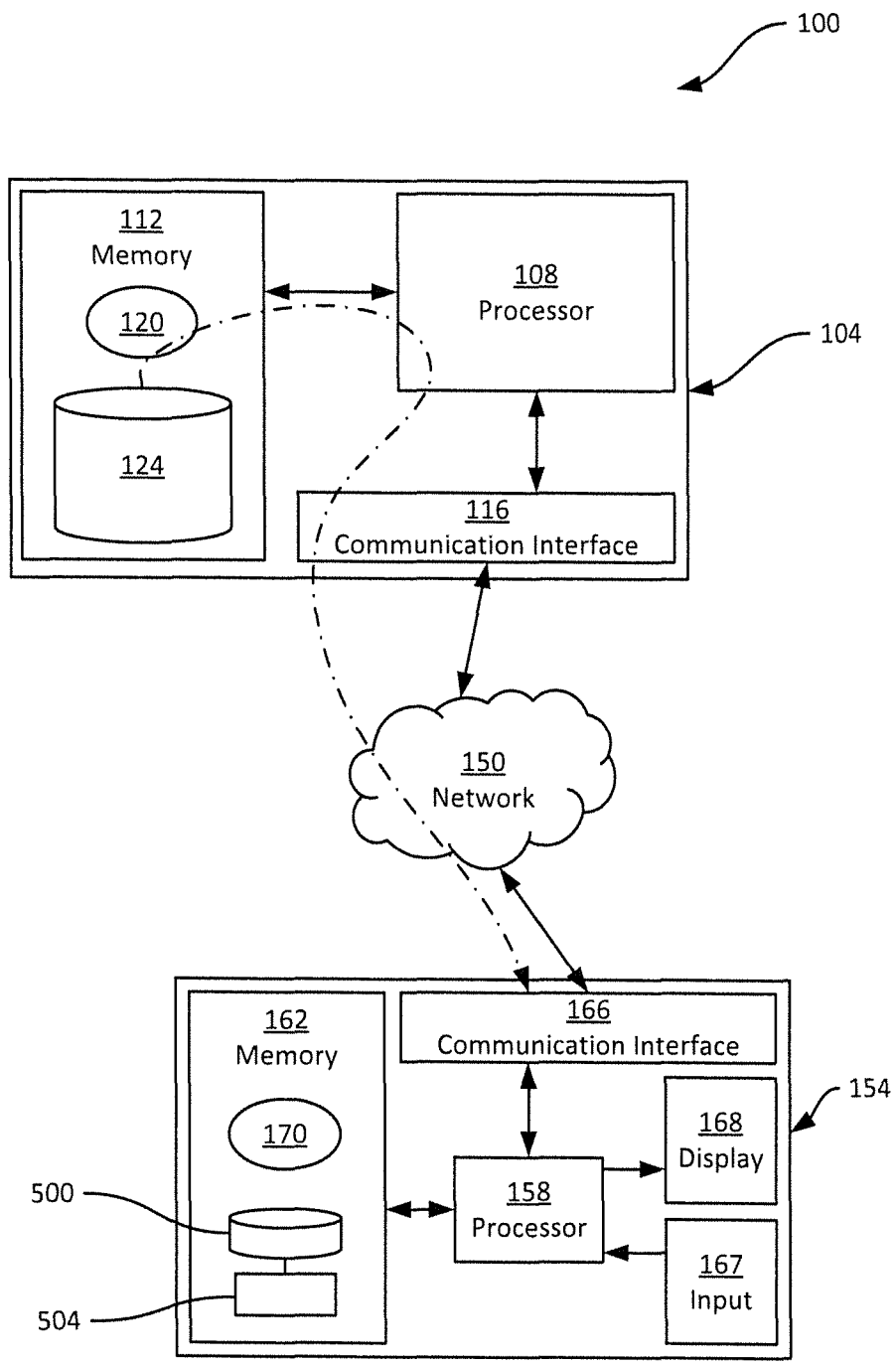
FIG. 5 depicts the receipt of initial search inputs and predicted search results during the performance of the method of FIG. 2.

At block 235, the server 104 is configured to transmit the predicted search results and the corresponding set of initial inputs to the client device 154. Turning to FIG. 5, the predicted search results are shown as being selected from the database 124 via execution of the application 120 and transmitted over the network 150 to the client device 154. The client device 154, at block 240, is configured to receive and store the predicted search results and initial inputs in the memory 162. For example, FIG. 5 illustrates a set of predicted search results 500 and the initial inputs 504 employed to generate the predicted search results 500. The initial inputs 504, for example, may contain the initial inputs shown above in Table 1. When more than one set of predicted search results is generated at block 230, each of the sets of predicted search results are transmitted to the client device 154 for storage in the memory 162, along with the corresponding set of initial inputs.

Following transmission of the predicted search results and initial inputs at block 235, the server 104 returns to block 215 to await further queries. Further, following the receipt and storage of the predicted search results and initial inputs at block 240, the client device 154 is configured to return to block 205 to await further input. It is noted that the predicted search results 500 are not displayed at the client device 154 responsive to their receipt at block 240. That is, the receipt and storage of the predicted search results is invisible to the operator of the client device 154 in the present example.

As will now be apparent, additional interim inputs are typically received at the client device 154 (e.g. the completion of the destination location field 308). Such additional interim inputs cause the client device 154 to issue additional interim queries to the server 104, which is configured to process the additional input queries as described above. Indeed, the server 104 may handle a plurality of interim queries in parallel. For example, a subsequent interim query may be received at block 220 before the generation of search results for the previous interim query is complete at block 230. The server 104 is configured to continue transmitting predicted search results and initial inputs at block 235 as the predicted search results become available (through completion of the corresponding search operations). The client device 154, meanwhile, can be configured to store only the most recently received predicted search results, but is preferably configured to store all received sets of predicted search results until a search command is received at block 205.

Figure 6:
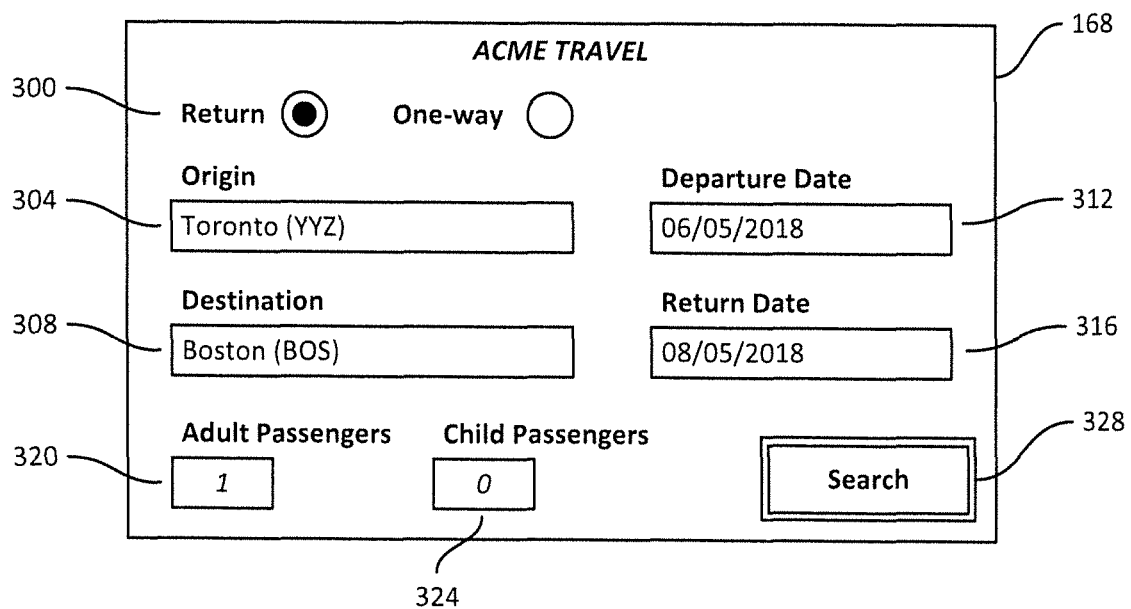
FIG. 6 depicts completion of the search input interface of FIG. 3A.

When a search command is received by the client device 154 at block 205—for example, in the form of a selection of the search element 328 shown in FIG. 3 via the input assembly 167—the client device 154 proceeds to block 245. At block 245, the client device 154 is configured to compare the final set of inputs present in the fields 300-324 at the time that the search command is received with the initial inputs 504 stored in the memory 162. Thus, the client device 154 is configured to retrieve the initial inputs 504 and compare the initial inputs 504 to the final inputs. FIG. 6 illustrates a set of final inputs received at the client device 154 via the input assembly 167. As is evident from FIG. 6, the final inputs match the initial inputs 504 (shown in Table 1). Returning to FIG. 2, the determination at block 245 is therefore affirmative. The client device 154 therefore proceeds directly to block 270, at which the search results stored in the memory 162 in association with the matching initial inputs (i.e. the predicted search results 500, in this example) are presented on the display 168.

Figure 7:
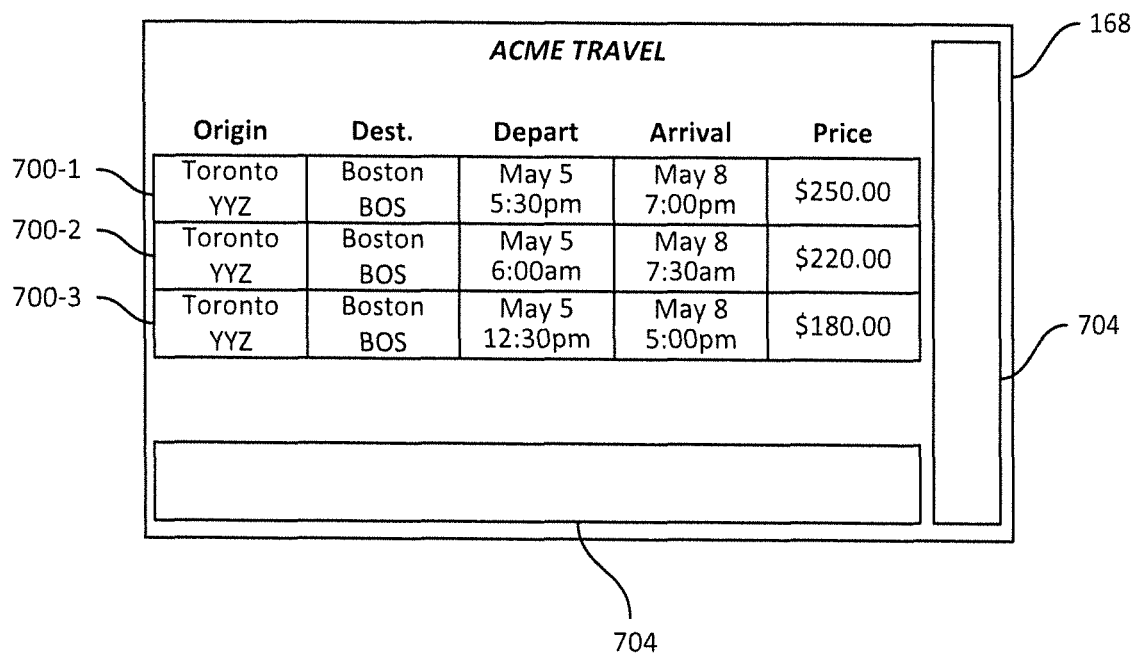
FIG. 7 depicts search results generated via performance of the method of FIG. 2.

FIG. 7 illustrates the presentation of search results 700-1, 700-2 and 700-3 (three search results 700 are shown, but it will be understood that any number of search results may be presented) on the display 168. The search results include, for example, origin and destination locations corresponding to those in the initial and final inputs, as well departure and arrival times and dates and prices. Additional attributes may be presented in association with the search results, such as airline names, stopover locations if applicable, and the like. As will now be apparent, following an affirmative determination at block 245 the search results 700 may be displayed without further requests to the server 104.

The presentation of search results can include the presentation of additional media elements 704, such as advertisements, images, and the like. The elements 704 can also be retrieved pre-emptively from the server 104, as will be discussed below in greater detail.

Returning to FIG. 2, when the determination at block 245 is negative, either because the initial inputs 504 do not match the final inputs or because no initial inputs are stored in the memory 162, the client device 154 proceeds to block 250. The client device 154 is also configured, following a negative determination at block 245, to discard any initial inputs and corresponding predicted search results stored in the memory 162.

Figure 8:
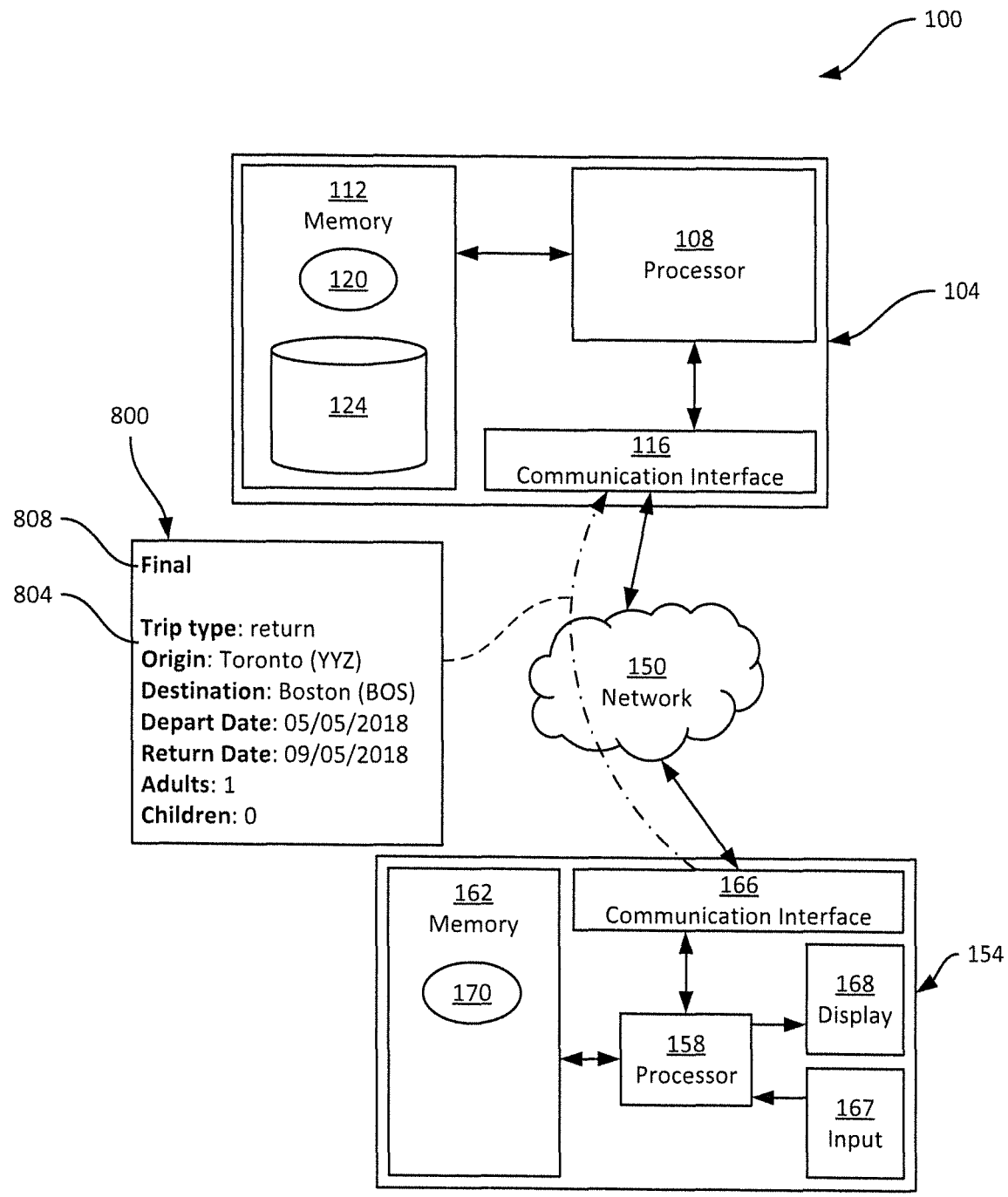
FIG. 8 depicts transmission of a final query during the performance of the method of FIG. 2.

At block 250, the client device 154 is configured to transmit a final query to the server 104, containing the final inputs. FIG. 8 illustrates the transmission of a final query 800 from the client device 154 to the server 104. As also seen in FIG. 8, the predicted search results 500 and the initial inputs 504 have been discarded following the negative determination at block 245. The final query includes a set of final inputs 804 (in which the departure and return dates do not match those predicted in the initial inputs 504 mentioned above). The final query 800 also includes an indication 808 distinguishing the final query 800 from interim queries, such as the query 400 mentioned earlier. The indicator 808 can take a wide variety of forms, and generally marks the query 800 as an explicit search instruction to the server 104, rather than a query that may or may not lead to the performance of a search.

Returning to FIG. 2, the server 104 is configured to receive the final query at block 255 and to initiate a single search operation to generate final search results corresponding to the final inputs. At block 260, the server 104 is configured to send the final search results to the client device 154 for storage and display. The client device 154, in turn, is configured to receive and store the final search results at block 265, and to then proceed to block 270 and display the stored search results (i.e. the final search results received at block 265).

A search command will typically not be received at block 205 until after a plurality of interim queries have been sent via successive performances of block 210. However, under some conditions the search command may be received before responses to any of the interim queries have been received at block 240, for example if the fields 300-324 shown in FIG. 3 are completed and the search element 328 is selected in less time than is required for the server 104 to complete the generation of predicted search results for the first interim query. In such situations, following the receipt of a search command at block 205, the determination at block 245 is negative, because no initial inputs are stored in the memory 162.

The client device 154 is therefore configured to transmit the final query at block 250. However, the responses to the interim queries are likely to arrive at the client device 154 before the final search results. Thus, even after sending a final query at block 250, the client device 154 can be configured to repeat the determination at block 245 responsive to the receipt of any search results and associated set of initial inputs.

The client device 154 is also configured, in some examples, to provide feedback to the server 104 in response to a negative determination at block 245. For example, the client device 154 can be configured to transmit a copy of the initial inputs that failed to match the final inputs along with the final query at block 250. The server 104 can be configured, in turn, to update the predictive model (e.g. the above-mentioned random forest) based on the indication that the prediction of search inputs was unsuccessful. The server 104 is also configured to store the final search inputs in the historical records mentioned earlier. To further enable updating of the historical records, the client device 154 can be configured to transmit the final inputs to the server 104 even following an affirmative determination at block 245. The final inputs may be transmitted to the server in this case with an indication that the transmission is for logging purposes only (i.e. that no search results are being requested).

Figure 9:
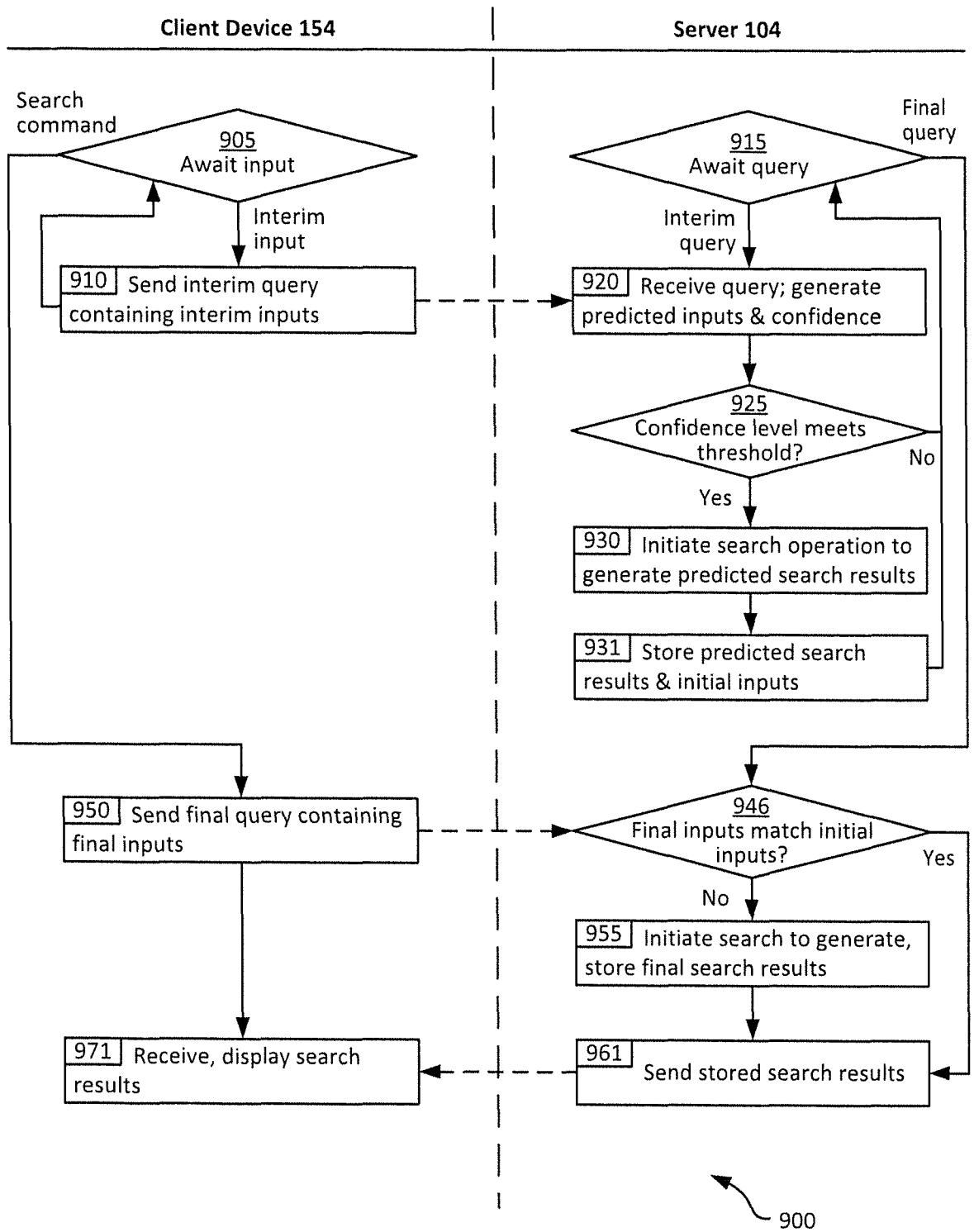
FIG. 9 depicts a method for controlling the generation of multi-input search results, according to another embodiment.

Turning to FIG. 9, another method 900 of controlling the generation of search results is illustrated. Several blocks of the method 900 are performed as described above in connection with the method 200; those blocks are numbered with the prefix "9" and a two-digit suffix corresponding to the two-digit suffix of the corresponding block in the method 200. Thus, for example, block 905 is performed by the client device 154 as described above in connection with block 205. Other blocks of the method 900 represent instances in which the method 900 diverges from the method 200—those blocks do not share a suffix with any blocks of the method 200.

At block 905, the client device 154 is configured to await input as discussed earlier. Upon receipt of an interim input, the client device 154 transmits an interim query at block 910, as also discussed above in connection with the method 200. Following transmission of the interim query, however, the client device 154 returns to block 905; as will be seen below, the client device 154 does not receive predicted search results before the receipt of a search command.

The server 104 is configured to receive the interim query at block 915 and to proceed to block 920, at which predicted search inputs and a corresponding confidence level are generated. The server 104 is then configured to determine whether the confidence level meets a preconfigured threshold at block 925. As set out above in connection with the method 200, when the determination at block 925 is negative, the server 104 proceeds to block 915, and when the determination at block 925 is affirmative, the server 104 proceeds to block 930. At block 930, the server 104 initiates one or more search operations, as set out above in connection with block 230.

At block 931, rather than sending the predicted search results and corresponding initial inputs to the client device 154, as in the method 200, the server 104 is configured to store the predicted search results and corresponding initial inputs in the memory 112. The server 104 then returns to block 915 to await a further query.

The client device 154, responsive to receiving a search command at block 905, sends a final query at block 950, containing the final inputs. In other words, the client device 154 sends the final query for every search command received, rather than only when the final inputs do not match the initial inputs as in the method 200. Indeed, the client device 154 in the method 900 cannot assess whether the final and initial inputs match, as the initial inputs are not sent to the client device 154.

When the query received at block 915 is a final query, the server 104 proceeds to block 946. At block 946 a determination is made as to whether the final inputs received from the client device 154 match the initial inputs stored at block 931. That is, the determination at block 946 is similar to that performed at block 245 of the method 200, except that the determination is performed by the server 104 rather than the client device 154.

When the determination at block 946 is negative (i.e. when the initial search inputs stored at block 931 do not match the final inputs), the server 104 is configured to discard the predicted search results and initiate a search operation at block 950 to generate final search results. The final search results are stored in the memory 112 for transmission to the client device 154 at block 961. When the determination at block 946 is affirmative, the server 104 proceeds directly to block 961, at which the stored search results are transmitted to the client device 154, for receipt and display by the client device 154 at block 971. As will now be apparent, the server 104 is also configured to update the historical records, and optionally the predictive model employed at block 925, based on the final query and the outcome of the determination at block 946.

Figure 10:
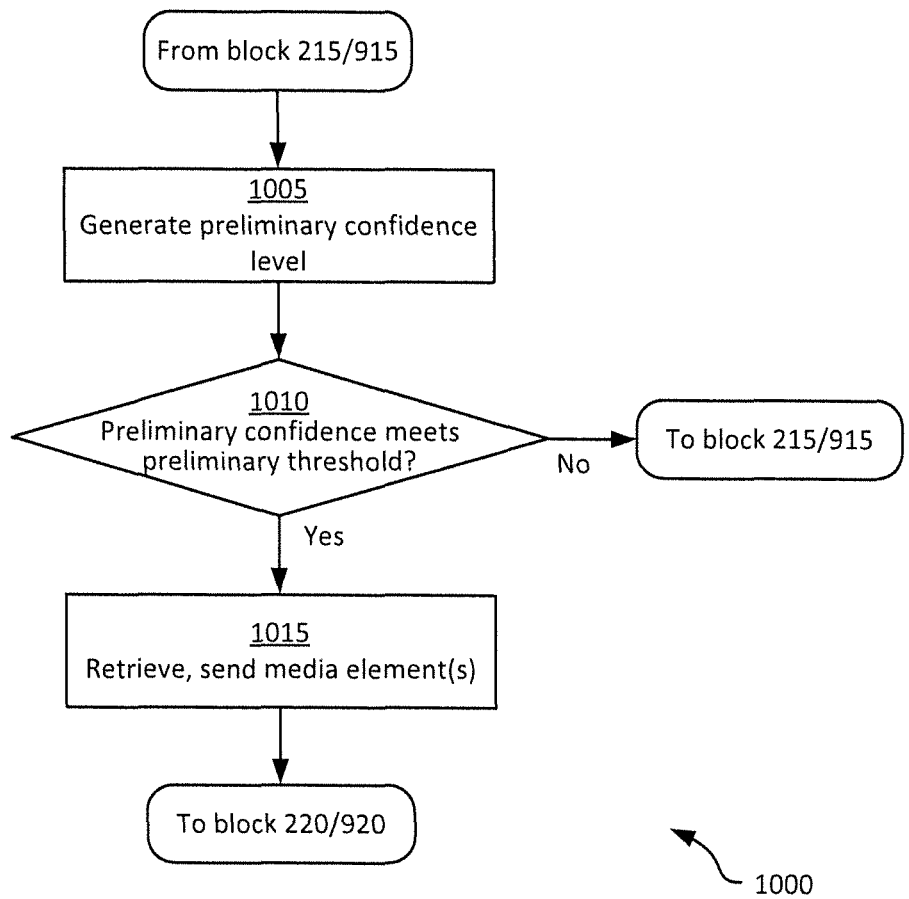
FIG. 10 depicts a method of pre-emptively retrieving media elements for use in presenting search results.

As noted earlier, the presentation of search results at the client device 154 may include the display of media elements, such as the elements 704 shown in FIG. 7. The media elements 704 may be retrieved from the server 104 pre-emptively in some examples. Referring to FIG. 10, a method 1000 of pre-emptively retrieving media elements for use in presenting search results is shown as performed by the server 104.

In particular, the server 104 is configured, at block 1005, upon receipt of an interim query from the client device 154, to generate a preliminary confidence level indicating a likelihood that the client device 154 will generate a final query. The preliminary confidence level may be generated employing similar mechanisms as those described in conjunction with block 220. The preliminary confidence level may be generated, in some examples, based on the number of interim inputs contained in the interim query. For example, the preliminary confidence level may be set at 70% if the interim query contains a single input, and at 100% if the interim query contains more than one input. In other examples, the historical records stored by the server 104 may also include incomplete searches (e.g. where one or more interim queries were received, but no final query). The server 104 may therefore determine the preliminary confidence based on any suitable combination of factors, including the inputs, the time of day and the like (e.g. based on a predictive model such as the above-mentioned random forest).

The server 104 is then configured, at block 1010, to determine whether the preliminary confidence level meets a configurable preliminary threshold. The preliminary threshold is set at a level indicating a sufficient likelihood that the client device 154 will submit a final query to justify the commitment of computational resources and network bandwidth required to transmit the elements 704 to the client device 154.

When the determination at block 1010 is negative, the server 104 returns to block 215 or 915, without performing block 220 or 920. When the determination at block 1010 is affirmative, however, at block 1015 the server 104 retrieves and sends one or more media elements (e.g. the media elements 704) to the client device 154 for storage pending the receipt of a final query. The server 104 then proceeds to block 220 or 920.

Variations to the above are contemplated. For example, the client device 154 can be configured to delay the transmission of an interim query until a minimum number of search inputs have been received, or until one or more specific inputs have been received (e.g. origin location and departure date).

In further examples, the server 104 can be configured to store predicted search results for use in the event that the corresponding predicted search inputs fail to match the final search inputs. For example, if the final inputs do not match the predicted inputs, but only the passenger type code inputs were incorrectly predicted, the server 104 may be able to re-use the search results, which are not typically dependent on passenger type code. The generation of final search results then requires only an assessment of availability for the search results already selected (which match all the remaining final inputs).

In still further examples, the threshold applied at blocks 225 and 925 may be adjusted dynamically by the server 104. For example, the historical records can include indications of which searches led to bookings (i.e. purchased tickets for flights). When the predicted search inputs generated at blocks 220 or 920 correspond to search inputs associated with a high likelihood of leading to a booking, the server 104 may be configured to lower the threshold applied at blocks 225 or 925, in order to increase the number of sets of predicted search results prepared for the client device 154.

Those skilled in the art will appreciate that in some embodiments, the functionality of the applications 120 and 170 may be implemented using pre-programmed hardware or firmware elements (e.g., application specific integrated circuits (ASICs), electrically erasable programmable read-only memories (EEPROMs), field-programmable gate arrays (FPGAs), etc.), or other related components.

Within the description, the terms such as the interim query, additional query and final query have their usual and common meanings in the art as will be understood by those skilled in the art. In the above examples, the interim query may also be referred to as a partial or incomplete query, i.e. a query which does not include values for each of a set of inputs required by the server 104 to initiate a search. Also, the interim query does not result from selection of the search element 328 and thus a search command (i.e., receipt of the explicit instruction at the input assembly 167). Insofar, the term "interim" is to be understood as non-final, provisional, preliminary, temporary, or the like. On the other hand, the final query may also be referred to as a complete query, i.e. a query which includes values for each of the set of inputs required by the server 104 to initiate the search. Also, the final query is distinguished from the interim query in that it results from the selection of the search element 328 and thus the search command (i.e., receipt of the explicit instruction at the input assembly 167). Insofar, the term "final" is to be understood as complete, definitive, non-provisional, or the like. As used in the example, additional queries may refer to another query either being an interim query or a final query.

The scope of the claims should not be limited by the embodiments set forth in the above examples, but should be given the broadest interpretation consistent with the description as a whole.

The invention claimed is:

1. A method comprising:
receiving, at a server from a client device, an interim query associated with a travel event and containing a subset of interim search inputs;
generating, at the server, a preliminary confidence level indicating a likelihood that the client device will generate a final query based on the subset of interim search inputs;
when the preliminary confidence level exceeds a first threshold, retrieving and transmitting intermediate search results to the client device for storage at the client device pending receipt of the intermediate search results;

generating, at the server, a subset of predicted search inputs and a confidence level associated with the subset of predicted search inputs based on the subset of interim search inputs;

when the confidence level exceeds a second threshold, initiating a search operation to generate predicted search results based on a set of initial inputs including the subset of interim search inputs and the subset of predicted search inputs;

when the confidence level does not exceed the second threshold, awaiting an additional query without initiating the search operation; and transmitting, from the server to the client device, a search response based on the intermediate search results associated with the interim query or additional search results associated with the additional query.

2. The method of claim 1, wherein transmitting the search response comprises:

responsive to generation of the predicted search results, transmitting the predicted search results to the client device for display at the client device following receipt of a set of final inputs matching the set of initial inputs at the client device.

3. The method of claim 1, wherein transmitting the search response comprises:

responsive to generation of the predicted search results, storing the predicted search results pending receipt of the final query.

4. The method of claim 3, further comprising:

receiving the final query containing a set of final inputs;

in response to determining that the set of final inputs matches the set of initial inputs, transmitting the predicted search results; and in response to determining that the set of final inputs does not match the set of initial inputs, initiating a further search operation to generate final search results based on the set of final inputs, and transmitting the final search results.

5. The method of claim 3, wherein the final query further contains a search command indicating a selection of a search element at the client device.

6. The method of claim 1, further comprising:

receiving the additional query; and when the additional query is a further interim query containing a subset of further interim search inputs, repeating the generation of predicted search inputs and a confidence level associated with the predicted search inputs; and when the additional query is the final query containing a set of final inputs, initiating a further search operation to generate final search results based on the set of final inputs, and transmitting the final search results.

7. The method of claim 1, wherein the subset of interim search inputs corresponds to a first subset of predefined input fields presented at the client device, and the subset of predicted search inputs corresponds to a remaining subset of the predefined input fields.

8. The method of claim 1, further comprising:

responsive to receiving the interim query, prior to generating the subset of predicted search inputs, retrieving a media element and transmitting the media element to the client device for storage at the client device pending receipt of the search results.

9. The method of claim 1, wherein generating the subset of predicted search inputs and the confidence level includes retrieving a historical record of received queries and corresponding responses, and comparing the historical record of received queries to the subset of interim search inputs.

10. A method comprising:

receiving, at a client device, a subset of interim search inputs;

generating and sending an interim query associated with a travel event and containing the subset of interim search inputs; and in response to sending the interim query:

receiving and storing intermediate search results based on whether a preliminary confidence level exceeds a first threshold, the preliminary confidence level indicating a likelihood that the client device will generate a final query based on the subset of interim search inputs;

receiving and storing a set of initial inputs including the subset of interim search inputs and a subset of predicted search inputs, and predicted search results corresponding to the set of initial inputs;

receiving, at the client device, a set of final inputs; and presenting, by the client device, a search response on a display of the client device, according to whether the set of final inputs matches the set of initial inputs.

11. The method of claim 10, wherein presenting the search response comprises:

retrieving the set of initial inputs from storage;

comparing the set of initial inputs to the set of final inputs;

responsive to determining that the set of final inputs matches the set of initial inputs, retrieving the predicted search results and presenting the predicted search results on the display; and responsive to determining that the set of final inputs does not match the set of initial inputs, sending the final query containing the set of final inputs, and receiving and presenting on the display, in response to the final query, final search results.

12. A server comprising:

a memory;

a communications interface; and a processor interconnected with the memory and the communications interface, wherein the memory includes instructions that, upon execution by the processor, cause the server to perform operations, the operations comprising:

receiving, from a client device, an interim query associated with a travel event and containing a subset of interim search inputs;

generating a preliminary confidence level indicating a likelihood that the client device will generate a final query based on the subset of interim search inputs;

when the preliminary confidence level exceeds a first threshold, retrieving and transmitting intermediate search results to the client device for storage at the client device pending receipt of the intermediate search results;

generating a subset of predicted search inputs and a confidence level associated with the subset of predicted search inputs based on the subset of interim search inputs;

when the confidence level exceeds a second threshold, initiating a search operation to generate predicted search results based on a set of initial inputs including the subset of interim search inputs and the subset of predicted search inputs;

when the confidence level does not exceed the second threshold, awaiting an additional query without initiating the search operation; and transmitting, to the client device, a search response based on the intermediate search results associated with the interim query or additional search results associated with the additional query.

13. The server of claim 12, wherein transmitting the search response comprises:
responsive to generation of the predicted search results, transmitting the predicted search results to the client device for display at the client device following receipt of a set of final inputs matching the set of initial inputs at the client device.

14. The server of claim 12, wherein transmitting the search response comprises:
responsive to generation of the predicted search results, storing the predicted search results pending receipt of the final query.

15. The server of claim 14, wherein the instructions, when executed, further cause the server to perform additional operations, the additional operations comprising:
receiving the final query containing a set of final inputs;
in response to determining that the set of final inputs matches the set of initial inputs, transmitting the predicted search results; and
in response to determining that the set of final inputs does not match the set of initial inputs, initiating a further search operation to generate final search results based on the set of final inputs, and transmitting the final search results.

16. The server of claim 14, wherein the final query further contains a search command indicating a selection of a search element at the client device.

17. The server of claim 12, wherein the instructions, when executed, further cause the server to perform additional operations, the additional operations comprising:
receiving the additional query; and
when the additional query is a further interim query containing a subset of further interim search inputs, repeating the generation of predicted search inputs and a confidence level associated with the predicted search inputs; and
when the additional query is the final query containing a set of final inputs, initiating a further search operation to generate final search results based on the set of final inputs, and transmitting the final search results.

18. The server of claim 12, wherein the instructions, when executed, further cause the server to perform additional operations, the additional operations comprising:
responsive to receiving the interim query, prior to generating the subset of predicted search inputs, retrieving a media element and transmitting the media element to the client device for storage at the client device pending receipt of the search results.

19. A client device comprising:
an input device;
a memory;
a communications interface; and
a processor interconnected with the memory, the input device, and the communications interface, wherein the memory includes instructions that, upon execution by the processor, cause the client device to perform operations, the operations comprising:
receiving a subset of interim search inputs;
generating and sending an interim query associated with a travel event and containing the subset of interim search inputs; and
in response to sending the interim query:
receiving and storing intermediate search results based on whether a preliminary confidence level exceeds a first threshold, the preliminary confidence level indicating a likelihood that the client device will generate a final query based on the subset of interim search inputs;
receiving and storing a set of initial inputs including the subset of interim search inputs and a subset of predicted search inputs, and predicted search results corresponding to the set of initial inputs associated with the intermediate search results;
receiving a set of final inputs; and
presenting a search response on a display of the client device, according to whether the set of final inputs matches the set of initial inputs associated with the intermediate search results.

* * * * *